(12) United States Patent
Richter et al.

(10) Patent No.: US 6,228,537 B1
(45) Date of Patent: May 8, 2001

(54) ELECTRODE GRID FOR LEAD BATTERIES

(75) Inventors: Gerolf Richter, Hildesheim; Joachim Illmann, Garbsen; Peter Streuer, Hannover, all of (DE)

(73) Assignee: VB Autobatterie GmbH, Hannover (DE)

( * ) Notice: Subject to any disclaimer, the term of this patent is extended or adjusted under 35 U.S.C. 154(b) by 0 days.

(21) Appl. No.: 09/133,139

(22) Filed: Aug. 12, 1998

(30) Foreign Application Priority Data

Aug. 27, 1997 (DE) .............................................. 197 37 197

(51) Int. Cl.$^7$ ...................................................... H01M 4/73
(52) U.S. Cl. ............................................ 429/243; 429/241
(58) Field of Search ................................. 29/2; 429/241, 429/242, 243

(56) References Cited

U.S. PATENT DOCUMENTS

| | | | |
|---|---|---|---|
| 345,511 | * | 7/1886 | Khotinsky . |
| 3,249,981 | * | 5/1966 | Sabatino . |
| 3,710,430 | * | 1/1973 | Long et al. ............................. 29/413 |
| 5,093,970 | * | 3/1992 | Senoo et al. ............................... 29/2 |
| 5,223,354 | * | 6/1993 | Senoo et al. .......................... 429/242 |

\* cited by examiner

*Primary Examiner*—Carol Chaney
(74) *Attorney, Agent, or Firm*—Schnader Harrison Segal & Lewis LLP

(57) ABSTRACT

The invention pertains to an electrode grid for lead batteries with a rectangular grid frame, pasting accessory rails arranged on it, and a group of grid cross members which form the skeleton to hold the active mass, the pasting accessory rails extending on both sides of the electrode grid solely in the pasting direction and, especially on the front and back side of the electrode grid, are arranged offset from each other.

16 Claims, 2 Drawing Sheets

ELECTRODE GRID FOR LEAD BATTERIES

BACKGROUND OF THE INVENTION

1. Field of the Invention

The invention pertains to an electrode grid for lead batteries with a rectangular grid frame, pasting accessory rails arranged on it, and a group of grid cross members forming the skeleton to hold the active mass.

2. Description of the Related Art

A large number of electrode grids are known for the production of lead-acid batteries which are supposed to satisfy different, sometimes conflicting requirements. For example, it is demanded of electrode grids that they display a low weight, a low internal resistance, easy fabrication, combined with good shape stability with simultaneously good holding capacity for the active mass. Lead-acid batteries used in motor vehicles must have a high specific capacity relative to both volume and weight and display good current output. Since the electrode grids produced by casting procedures display deviations in their thickness related to the fabrication process, which result in difficulties in pasting-in the active mass and greater installation spacing, U.S. Pat. No. 3,249,981 has already proposed that pasting accessory rails be provided on the grid frame which are subsequently calibrated to a uniform grid thickness. However, the weight of the grid is further increased by this approach.

SUMMARY OF THE INVENTION

The invention has the objective of devising an electrode grid which conforms to the requirements mentioned above, especially as regards minimizing the weight. According to the invention, the problem is solved by an electrode grid for lead batteries, the electrode grid comprising a rectangular grid frame, a plurality of pasting accessory rails arranged on the grid frame, and a plurality of grid cross members forming a skeleton to hold an active mass, wherein the pasting accessory rails extend on both sides of the grid frame solely in the pasting direction.

It was found that pasting accessory rails for the production of uniformly pasted electrode grids are sufficient solely in the pasting direction. The electrode plates produced from them display no impairment of their properties compared to conventional electrode plates although less lead is used in casting electrode grids of comparable size. For the conventional grid thicknesses of 1.1, 1.3, 1.5, 1.7, and 1.9 mm, this means that the corresponding grid thickness is not related to a change in the thickness of the grid frame, but only the height of the pasting accessory rails which is selected accordingly. At a grid thickness of 1.7 mm, this achieves a weight reduction of, for example, about 10%. In addition, the electrode grid configuration according to the invention improves the pastability of the electrode grid.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

EXAMPLE 1

Figure 1:
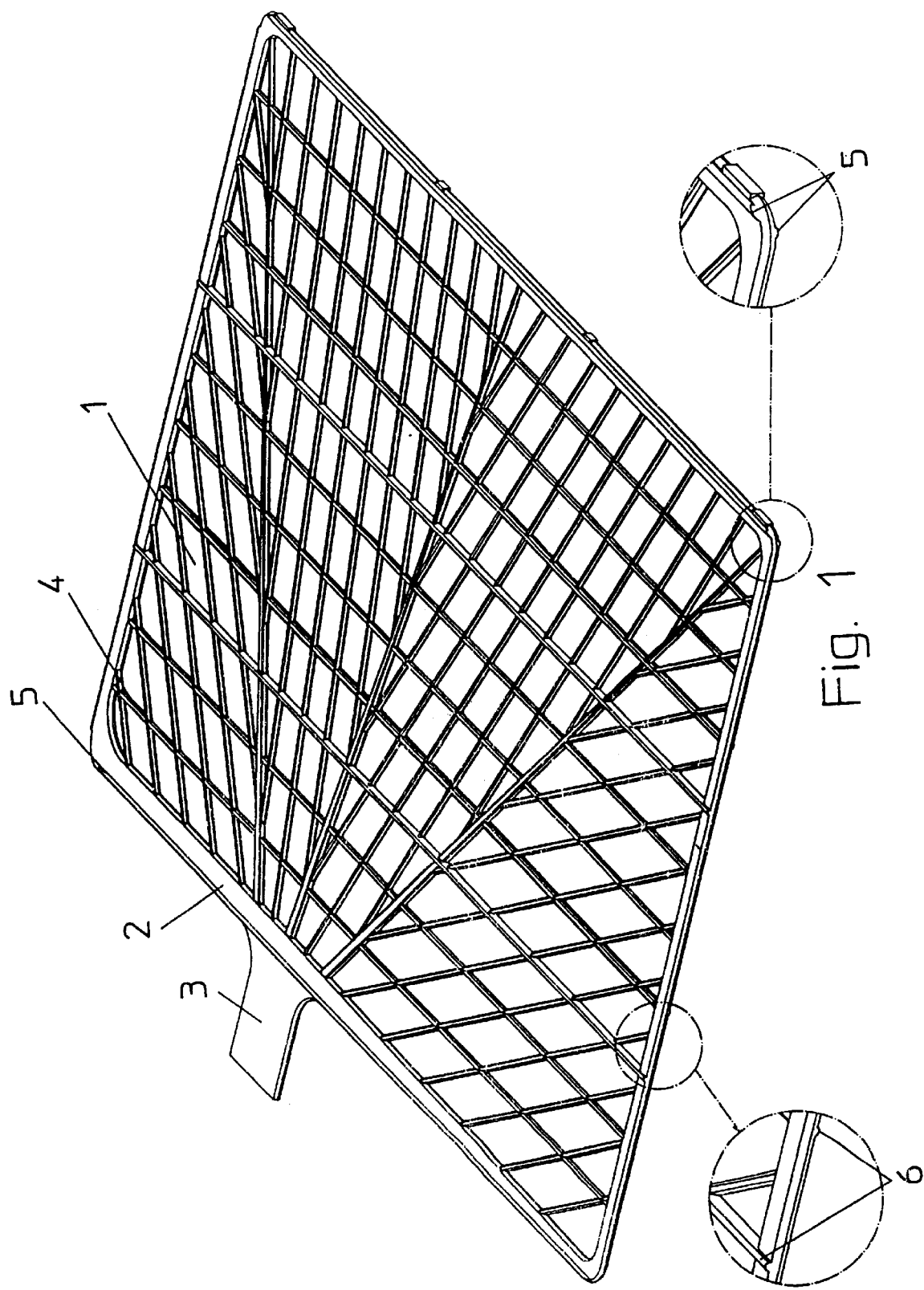
FIG. 1 shows a perspective representation of an electrode grid according to one Example 1 of the invention.

A rectangular electrode grid 1 as shown in FIG. 1 has a current tapping lug 3 in the central region of the upper frame edge 2. The grid cross members 4 located in the grid frame are arranged in two groups, one group running parallel to the upper frame edge 2 and the other group aligned toward the current tapping lug 3 and crossed. The pasting accessory rails 5 are arranged on the front and back side of the upper and lower electrode grid frame. Each grid cross member 6 running parallel to the upper frame edge 2 is attached at each end to only one side of the electrode grid frame.

EXAMPLE 2

Figure 2:
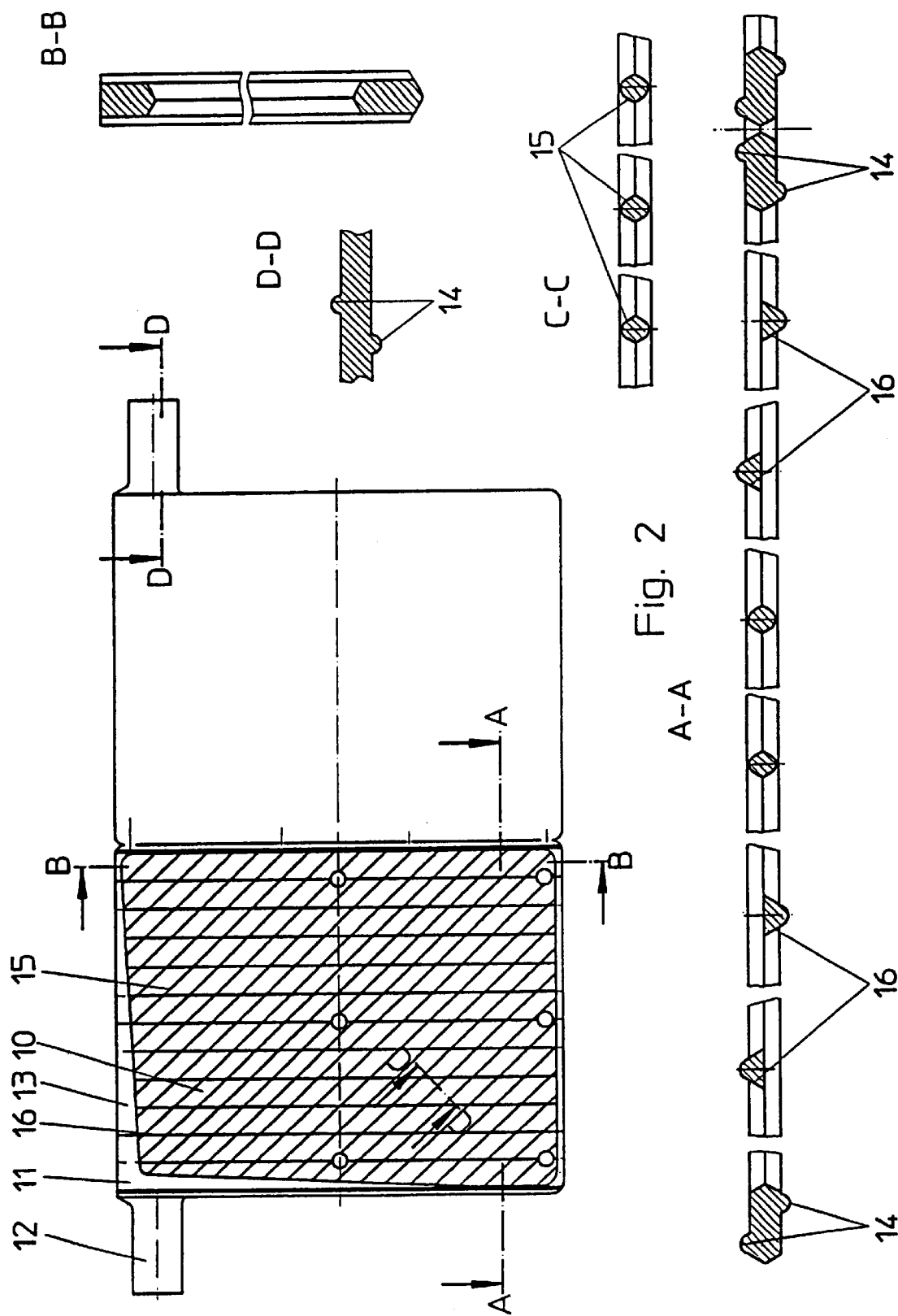
FIG. 2 shows a top view of an electrode grid as in Example 2 of the invention and the representation of the sections of this electrode grid along lines A—A, B—B, C—C, and D—D.

A rectangular electrode grid 10 according to FIG. 2 has a current tapping lug 12 on one corner of the upper frame edge 11. The grid frame 13 is not of uniform shape but rather becomes wider especially on the side of the grid adjacent to the current tapping lug 12 in the direction toward the current tapping lug 12. On the upper and lower grid frames 13 which are 0.8 to 1.2 mm thick, on the front and back side of the grid 10, pasting accessory rails 14, 0.2 to 0.6 mm in height, are arranged which extend parallel to the upper and lower edge of the grid. The pasting accessory rails 14 of the front and back side of the electrode grid 10 are offset relative to each other in such a way that they cannot lie one on the other and therefore impair the stackability of the electrode grid 10. The diagonally running grid cross members 15 have the thickness of the grid frame. Preferably one or more of the grid cross members 16 running parallel to the upper grid edge 11 are also designed to have pasting accessory rails 14 displaying an approximately triangular cross section, the base of the triangle being located approximately in the center of the grid plane, and the height of the triangle corresponding approximately to half the grid frame thickness plus the height of the pasting accessory rail 14. In this case also the grid cross members 16 provided with such pasting accessory rails are offset relative to each other on the front and back side of the electrode grid in order to enable them to be stacked easily.

U.S. Pat. No. 3,249,981 teaches the presence of pasting accessory rails 14 on both sides of all four edges of the grid frame. A grid having these rails is stamped or pressed so that they have a predetermined thickness. The grid is then filled up with a lead oxide paste from both sides in pasting machines which use belts or rolls. In the pasted grid, all inner parts of the grid and all parts of the frame are covered by the paste, with the rails defining the thickness of the final pasted grid.

According to the present invention, however, pasting accessory rails are provided only on two edges of the grid frame (e.g., the upper and lower edges) and in the direction in which the grids are pasted (i.e. parallel to the rails). In certain embodiments, the rails are integral parts of the grid frame and are formed during casting of the grid. In order to change the overall thickness of the final pasted grid, only the thickness of the rails needs to be changed; the rest of the grid including the rest of the frame can remain unchanged. This limits the increase in the weight of the grid for thicker pasted grids. In certain embodiments, the pasting accessory rails have approximately the width of the grid cross members running in the pasting direction and their height corresponds to approximately 20–60% of the grid frame thickness.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An electrode grid for lead batteries, the electrode grid comprising a grid frame with a plurality of grid cross members forming a skeleton to hold an active mass to be applied in a pasting direction, wherein the grid frame has pasting accessory rails on front and back sides of the grid frame solely in the pasting direction wherein only said pasting rails extend perpendicularly beyond the surface of the grid frame.

2. An electrode grid for lead batteries, the electrode grid comprising a grid frame with a plurality of grid cross members forming, a skeleton to hold an active mass to be applied in a pasting direction wherein the grid frame has pasting accessory rails on front and back sides of the grid frame solely in the pasting direction and the pasting accessory rails are arranged offset relative to each other on the front and back sides of the grid frame to improve stackability of grid frames.

3. An electrode grid for lead batteries, the electrode grid comprising a grid frame with a plurality of grid cross members forming a skeleton to hold an active mass to be applied in a pasting direction, wherein the grid frame has pasting accessory rails on front and back sides of the grid frame solely in the pasting direction and one or more of the grid cross members are parallel to the pasting direction and have a pasting accessory rail on only one side of the electrode grid.

4. The invention of claim 3, wherein the thickness of a grid cross member have a pasting accessory rail is less than the thickness of a portion of the grid frame having pasting accessory rails on both the front and back sides.

5. The invention of claim 4, wherein:
   the pasting accessory rails are arranged offset relative to each other on the front and back sides of the grid frame to improve stackability of grid frames; and
   the pasting accessory rails have approximately the width of the grid cross members running in the pasting direction and their height corresponds to approximately 20–60% of the grid frame thickness.

6. The invention of claim 1, wherein the pasting accessory rails have approximately the width of the grid cross members running in the pasting direction and their height corresponds to approximately 20–60% of the grid frame thickness.

7. An electrode grid for lead batteries, the electrode grid comprising a grid frame with a plurality of grid cross members forming a skeleton to hold an active mass to be applied in a pasting direction, wherein the grid frame has pasting accessory rails on front and back sides of the grid frame solely in the pasting direction, wherein the pasting accessory rails have approximately the width of the grid cross members running in the pasting direction and their height corresponds to approximately 20–60% of the grid frame thickness and the pasting accessory rails are arranged offset relative to each other on the front and back sides of the grid frame to improve stackability of grid frames.

8. A lead battery having an electrode grid, the electrode grid comprising a grid frame with a plurality of grid cross members forming a skeleton to hold an active mass to be applied in a pasting direction, wherein the grid frame has pasting accessory rails on front and back sides of the grid frame solely in the pasting direction wherein only said pasting rails extend perpendicularly beyond the surface of the grid frame.

9. A lead battery having an electrode grid, the electrode grid comprising a grid frame with a plurality of grid cross members forming a skeleton to hold an active mass to be applied in a pasting direction, wherein the grid frame has pasting accessory rails on front and back sides of the grid frame solely in the pasting direction and the pasting accessory rails are arranged offset relative to each other on the front and back sides of the grid frame to improve stackability of grid frames.

10. A lead battery having an electrode grid, the electrode grid comprising a grid frame with a plurality of grid cross members forming a skeleton to hold an active mass to be applied in a pasting direction, wherein the grid frame has pasting accessory rails on front and back sides of the grid frame solely in the pasting direction and one or more of the grid cross members are parallel to the pasting direction and have a pasting accessory rail on only one side of the electrode grid.

11. The invention of claim 10, wherein the thickness of a grid cross member have a pasting accessory rail on one side is less than the thickness of a portion of the grid frame having pasting accessory rails on both the front and back sides.

12. The invention of claim 11, wherein:
   the pasting accessory rails are arranged offset relative to each other on the front and back sides of the grid frame to improve stackability of grid frames; and
   the pasting accessory rails have approximately the width of the grid cross members running in the pasting direction and their height corresponds to approximately 20–60% of the grid frame thickness.

13. The invention of claim 8, wherein the pasting accessory rails have approximately the width of the grid cross members running in the pasting direction and their height corresponds to approximately 20–60% of the grid frame thickness.

14. A lead battery having an electrode grid, the electrode grid comprising a grid frame with a plurality of grid cross members forming a skeleton to hold an active mass to be applied in a pasting direction, wherein the grid frame has pasting accessory rails on front and back sides of the grid frame solely in the pasting direction, wherein the pasting accessory rails have approximately the width of the grid cross members running in the pasting direction and their height corresponds to approximately 20–60% of the grid frame thickness and the pasting accessory rails are arranged offset relative to each other on the front and back sides of the grid frame to improve stackability of grid frames.

15. An electrode grid for lead batteries, the electrode grid comprising a grid frame with a plurality of grid cross members forming a skeleton to hold an active mass to be applied in a pasting direction, wherein the grid frame has pasting accessory rails on front and back sides of the grid frame arranged only in substantially a parallel direction wherein only said pasting rails extend perpendicularly beyond the surface of the grid frame.

16. A lead battery having an electrode grid, the electrode grid comprising a grid frame with a plurality of grid cross members forming a skeleton to hold an active mass to be applied in a pasting direction, wherein the grid frame has pasting accessory rails on front and back sides of the grid frame arranged only in substantially a parallel direction wherein only said pasting rails extend perpendicularly beyond the surface of the grid frame.

* * * * *